(12) United States Patent
Peker et al.

(10) Patent No.: US 7,555,149 B2
(45) Date of Patent: Jun. 30, 2009

(54) METHOD AND SYSTEM FOR SEGMENTING VIDEOS USING FACE DETECTION

(75) Inventors: Kadir A. Peker, Burlington, MA (US); Ajay Divakaran, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 696 days.

(21) Appl. No.: 11/258,590

(22) Filed: Oct. 25, 2005

(65) Prior Publication Data

US 2007/0091203 A1    Apr. 26, 2007

(51) Int. Cl.
*G06K 9/00* (2006.01)
(52) U.S. Cl. ........................ 382/118; 382/170; 382/171; 382/190
(58) Field of Classification Search ................ 382/118, 382/128, 209, 219, 170, 171, 190, 282; 348/267, 348/143
See application file for complete search history.

(56) References Cited

U.S. PATENT DOCUMENTS

| | | | |
|---|---|---|---|
| 5,802,361 A * | 9/1998 | Wang et al. | 382/217 |
| 5,832,115 A * | 11/1998 | Rosenberg | 382/199 |
| 6,157,744 A * | 12/2000 | Nagasaka et al. | 382/236 |
| 6,292,575 B1 * | 9/2001 | Bortolussi et al. | 382/118 |
| 6,449,608 B1 * | 9/2002 | Morita et al. | 707/3 |
| 6,504,942 B1 * | 1/2003 | Hong et al. | 382/103 |
| 6,847,680 B2 * | 1/2005 | Divakaran et al. | 375/240.01 |
| 7,027,054 B1 * | 4/2006 | Cheiky et al. | 345/473 |
| 7,165,029 B2 * | 1/2007 | Nefian | 704/236 |
| 7,167,519 B2 * | 1/2007 | Comaniciu et al. | 375/240.08 |

OTHER PUBLICATIONS

TREC Video Retrieval Evaluation (2003) http://www-nlpir.nist.gov/projects/tv2003/tv2003.html. Nov. 2003.
Divakaran, A.; Peker, K.A.; Radharkishnan, R.; Xiong, Z.; Cabasson, R., "Video Summarization Using MPEG-7 Motion Activity and Audio Descriptors", Video Mining, Rosenfeld, A.; Doermann, D.; DeMenthon, D., Oct. 2003 Kluwer Academic Publishers.
P. Viola and M. Jones, "Robust real-time object detection," IEEE Workshop on Statistical and Computational Theories of Vision. 2001.
Jasinschi et al., "Integrated multimedia processing for topic segmentation and classification," ICIP-2001, pp. 366-369, 2001.
Wang et al., "Multimedia Content Analysis," IEEE Signal Processing Magazine, Nov. 2000.
Divakaran et al., "Content Based Browsing System for Personal Video Recorders," IEEE International Conference on Consumer Electronics (ICCE), Jun. 2002.

* cited by examiner

*Primary Examiner*—Yosef Kassa
(74) *Attorney, Agent, or Firm*—Dirk Brinkman; Gene Vinokur

(57) ABSTRACT

A method generates a summary of a video. Faces are detected in a plurality of frames of the video. The frames are classified according to a number of faces detected in each frame and the video is partitioned into segments according to the classifications to produce a summary of the video. For each frame classified as having a single detected face, one or more characteristics of the face is determined. The frames are labeled according to the characteristics to produce labeled clusters and the segments are partitioned into sub-segments according to the labeled clusters.

14 Claims, 6 Drawing Sheets

100

200

US 7,555,149 B2

METHOD AND SYSTEM FOR SEGMENTING VIDEOS USING FACE DETECTION

FIELD OF THE INVENTION

This invention relates generally to segmenting and browsing videos, and more particularly to segmentation, summarization and browsing of news videos using face detection.

BACKGROUND OF THE INVENTION

Prior art systems for browsing a news video typically rely on detecting transitions of news presenters to locate different topics or news stories. If the transitions are marked in the video, then a user can quickly skip from topic to topic until a desired topic is located.

Transition detection is usually done by applying high-level heuristics to text extracted from the news video. The text can be extracted from closed caption information, embedded captions, a speech recognition system, or combinations thereof, see Hanjalic et al., "Dancers: Delft advanced news retrieval system," IS&T/SPIE Electronic Imaging 2001: Storage and retrieval for Media Databases, 2001, and Jasinschi et al., "Integrated multimedia processing for topic segmentation and classification," ICIP-2001, pp. 366-369, 2001.

Presenter detection can also be done from low-level audio and visual features, such as image color, motion, and texture. For example, portions of the audio signal are first clustered and classified as speech or non-speech. The speech portions are used to train a Gaussian mixture model (GMM) for each speaker. Then, the speech portions can be segmented according to the different GMMS to detect the various presenters, see Wang et al., "Multimedia Content Analysis," IEEE Signal Processing Magazine, November 2000. Such techniques are often computationally intensive and do not make use of domain knowledge.

Another motion-based video browsing system relies on the availability of a topic list for the news video, along with the starting and ending frame numbers of the different topics, see Divakaran et al., "Content Based Browsing System for Personal Video Recorders," IEEE International Conference on Consumer Electronics (ICCE), June 2002. The primary advantage of that system is that it is computationally inexpensive because it operates in the compressed domain. If video segments are obtained from the topic list, then visual summaries can be generated. Otherwise, the video can be partitioned into equal sized segments before summarization. However, the later approach is inconsistent with the semantic segmentation of the content, and hence, inconvenient for the user.

Therefore, there is a need for a system that can reliably locate topics of interest in a news video. Then, the video can be segmented and summarized to facilitate browsing.

SUMMARY OF THE INVENTION

The invention provides a method for generating a summary of a video. Faces are detected in a plurality of frames of the video. The frames are classified according to a number of faces detected in each frame and the video is partitioned into segments according to the classifications to produce a summary of the video.

For each frame classified as having a single detected face, one or more characteristics of the face are determined. The frames are labeled according to the characteristics to produce labeled clusters and the segments are partitioned into sub-segments according to the labeled clusters.

DETAILED DESCRIPTION OF THE PREFERRED EMBODIMENTS

System Structure and Method Operation

Figure 1:
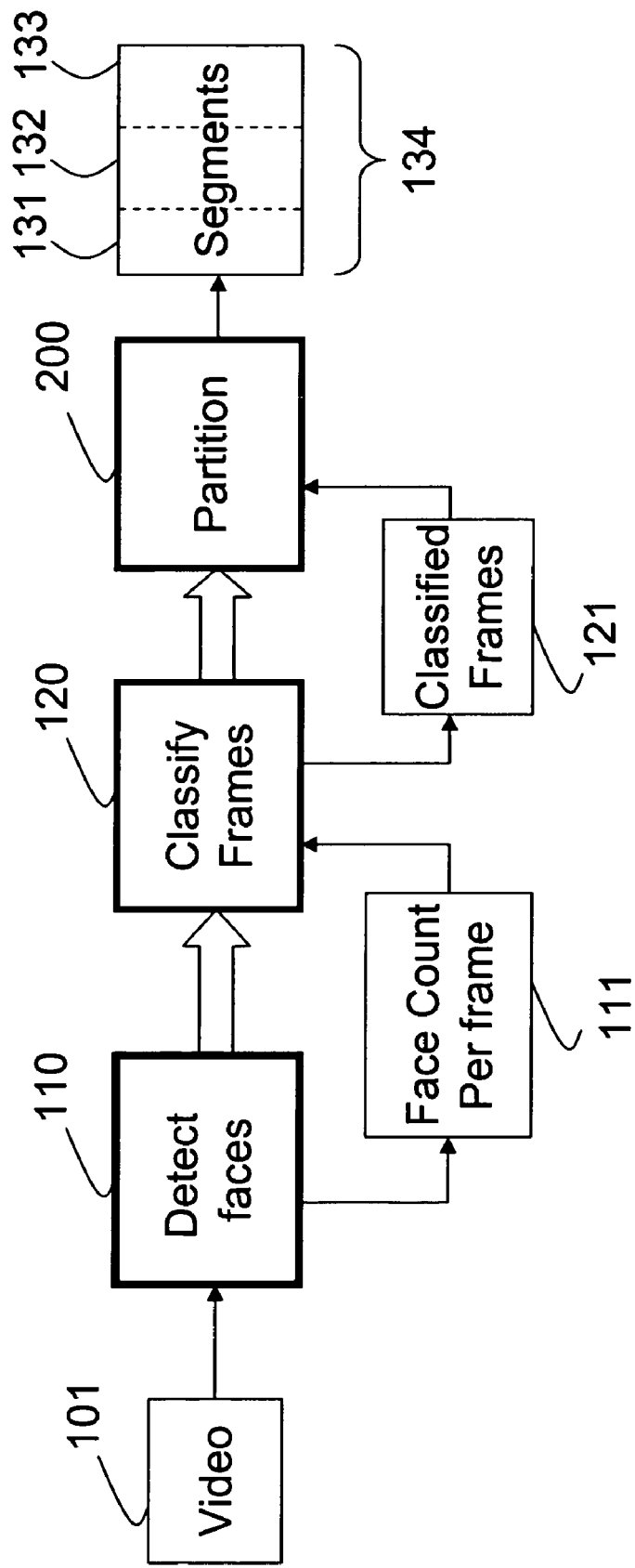
FIG. 1 is a block diagram of a method for generating a summary of a video according to the invention.

FIG. 1 shows a system and method 100 for summarizing a video 101 according to the invention. Faces are detected 110 in the plurality of frames of the video to determine a number of faces 111 in each frame. The frames are classified 120 according to a number of faces 111 detected in each frame and the video 101 is partitioned 200 into segments 131-133 according to the classifications 121 to produce a summary 134 of the video 101. The segments can include frames having a single face 131, two faces 132, and three or more faces 133.

Figure 2:
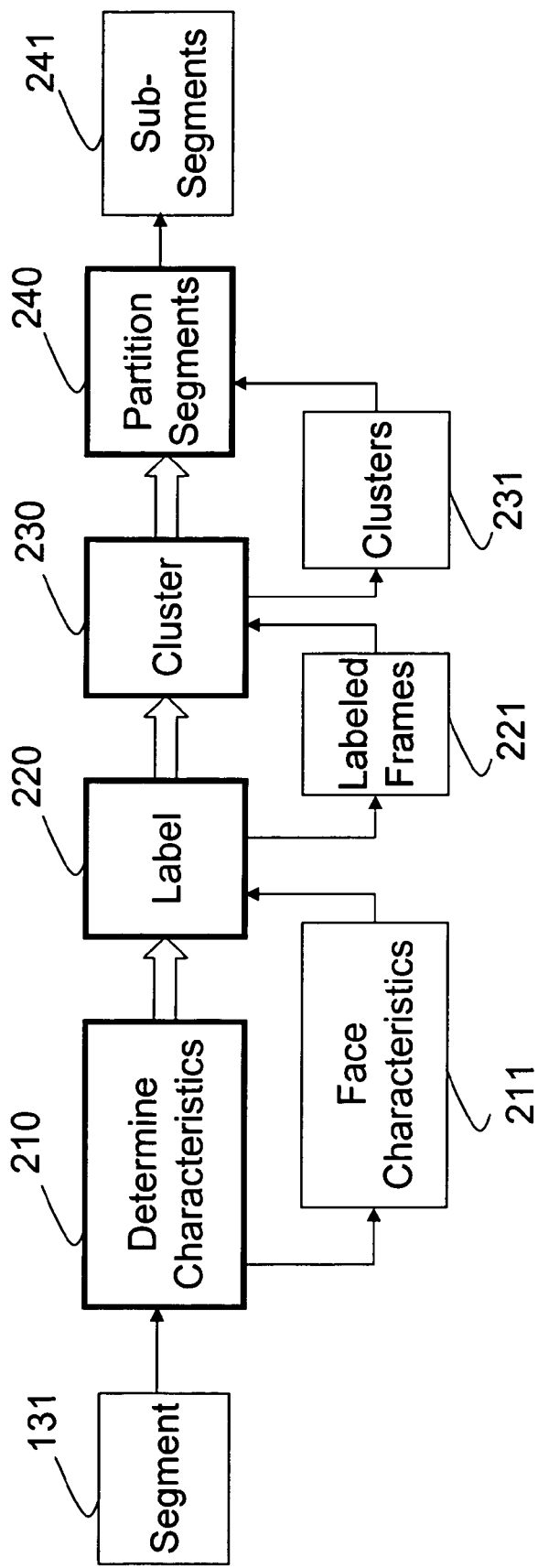
FIG. 2 is a block diagram of partitioning segments of the video according to the invention.

FIG. 2 shows a preferred embodiment of the partitioning 200. For each segment 131 including frames classified as having a single detected face, one or more characteristics 211 of the face are determined 210. Each frame in the segment 131 is labeled 220 according to the characteristics 211. The labeled frames 221 are clustered 230 according to the labels to produce labeled clusters 231 and the segments 131 having frames classified as single face frames are partitioned 240 into sub-segments 241 according to the labeled clusters.

A user can browse the video 101 according to the segments 131-133 and the sub-segments 141.

Face Detection in Consumer Video

In a preferred embodiment, we use the Viola-Jones face detector which provides high accuracy and high speed, see Viola et al., "System and Method for Detecting Objects in Images," U.S. patent application Ser. No. 10/200,464, filed Jul. 22, 2002, and incorporated by reference in its entirety. The Viola-Jones detector can also detect other objects by changing the parameter file used. Thus, the same detection engine can be used to detect several classes of objects, which can be used to segment the video 101.

The Viola-Jones face detector is based on boosted rectangular image features. We reduce frames to 360×240 pixels, and run the detection on one-pixel shifts of the image features. The speed is about 15 fps at these settings on a Pentium 4, 3 GHz PC, including decoding and display overheads. About one false detected face per 30-60 frames occurs with the frontal face detector.

The invention can operate on a compressed video. Using DC images increases the speed of the face detector dramatically, both through the detector, i.e., detection speed is proportional with the number of pixels of an image, and through savings in decoding. The minimum detected face size increases in the case of compressed video, but target faces in news video are often within the range. The detector can be run on only I-frames of the compressed video, or at a temporally sub-sampled rate appropriate for the processing power. An x-location, which is a position of the face in a frame of the video, is also determined.

Clustering Using Face X-Location and Size

We first classify each video frame, or optionally, larger units of frames depending on a temporal resolution chosen, based on the number of faces detected, into "1-face", "2-faces", and "3-or-more face" classes. In news video and other static-scene talk video such as talk shows and interviews, most of the segments have one face.

Figure 3:
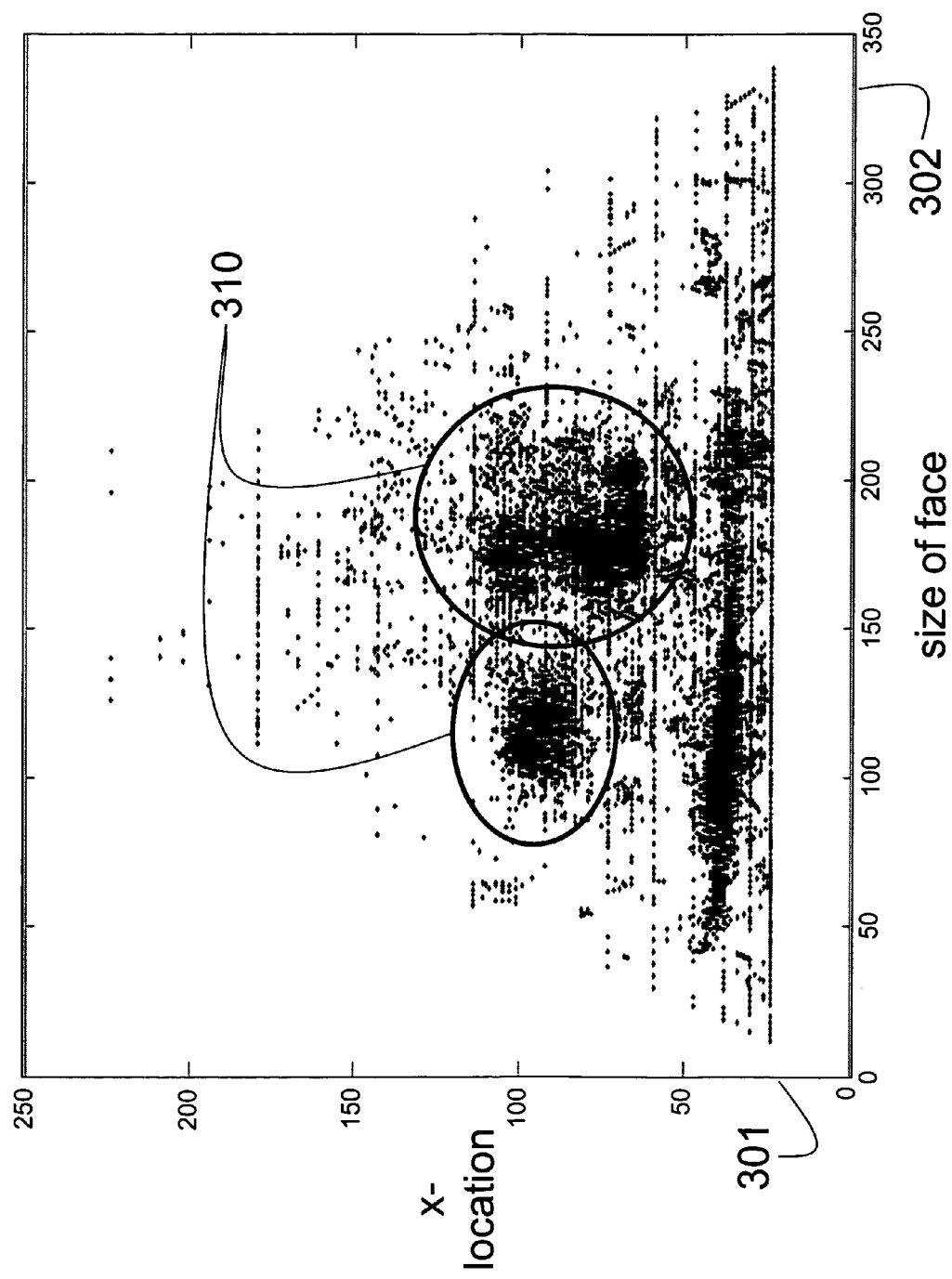
FIG. 3 is a scatter plot of video frame data classified as single face in a broadcast news program, using face x-location as the y-axis and face size as the x-axis.

We further partition 1-face segments based on face characteristics 210 in the frame. Face size and x-location are characteristics used for discriminating between different types of video scenes in our target video genres of news and talk shows. FIG. 3 illustrates the natural clustering 310 of 1-face video frames in a broadcast news program, using face x-location as the y-axis 301 and face size as the x-axis 302.

Figure 4:
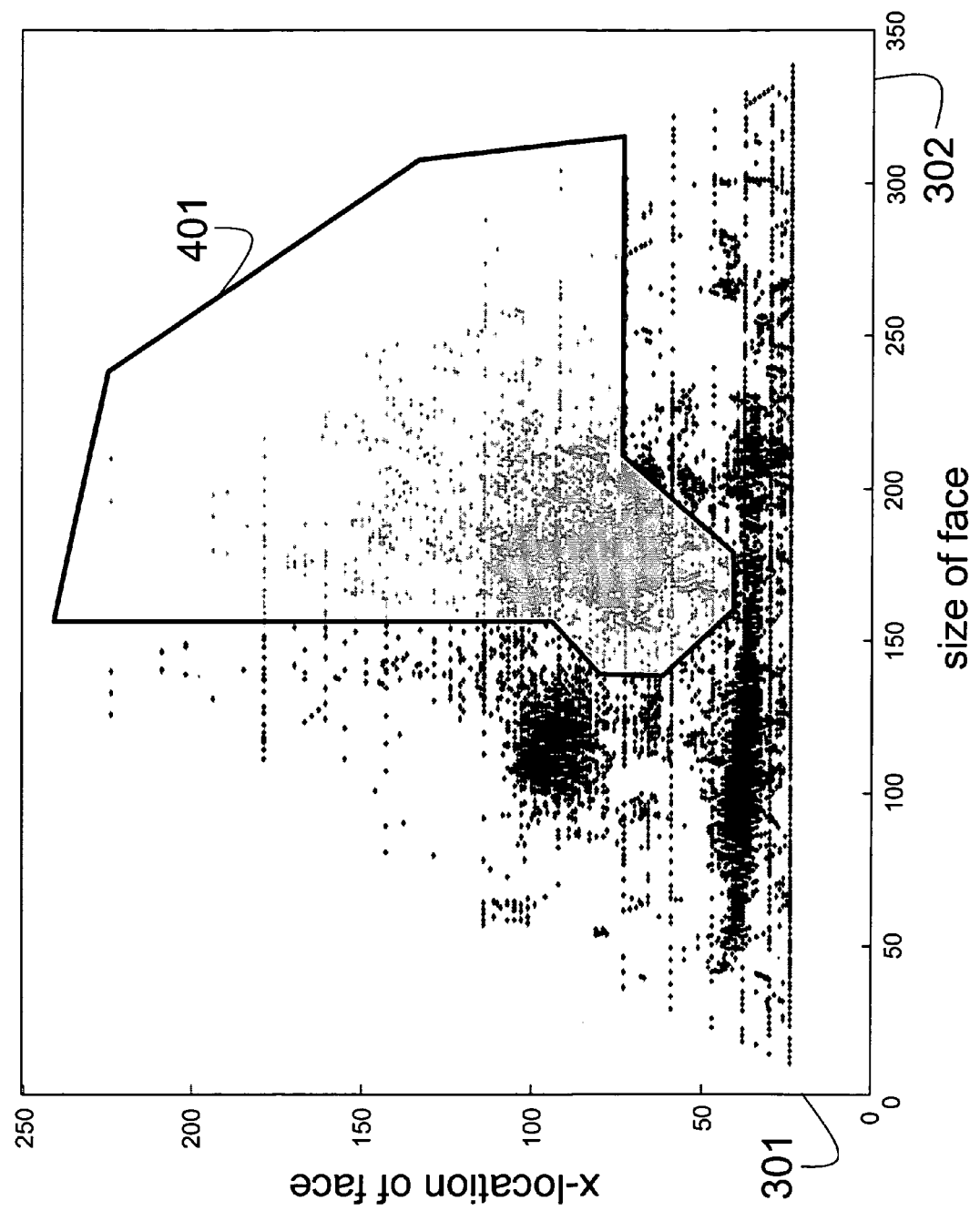
FIG. 4 is a scatter plot of the data from FIG. 3 with a cluster found using k-means clustering according to an embodiment of the invention.

We use k-means clustering for its low complexity and wide availability, with 3-5 clusters. FIG. 4 shows a scatter plot of the data from FIG. 3 with a cluster 401 found by k-means clustering.

Figure 5:
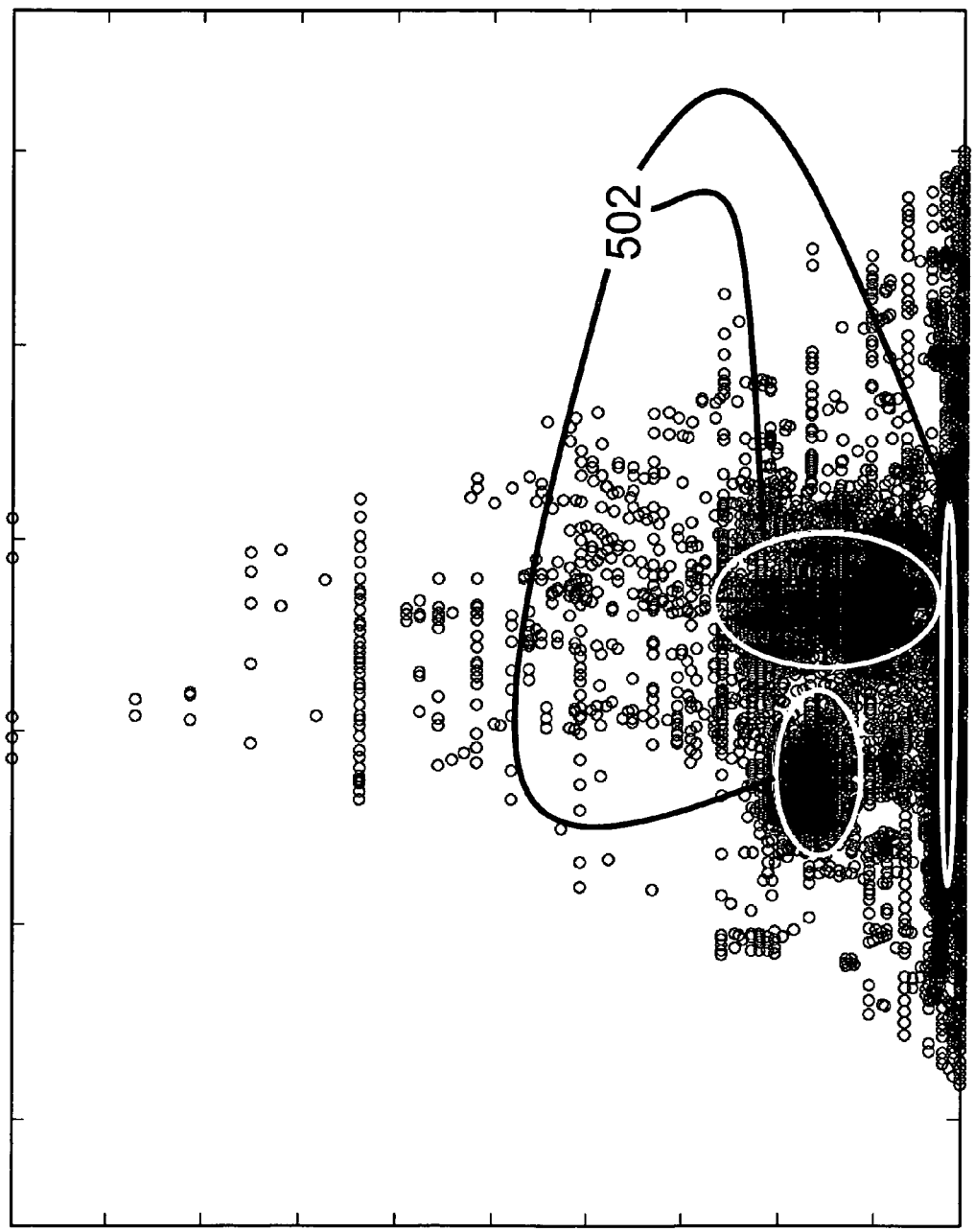
FIG. 5 is a scatter plot of the data from FIG. 3 with clusters found using GMMs according to an embodiment of the invention.

Gaussian mixture models (GMMs) can also be used for clustering, which give smoother cluster boundaries and more intuitive looking clusters than clusters produced by k-means clustering. FIG. 5 shows a scatter plot of the data from FIG. 3 with clusters 502 found using GMMs.

Figure 6:
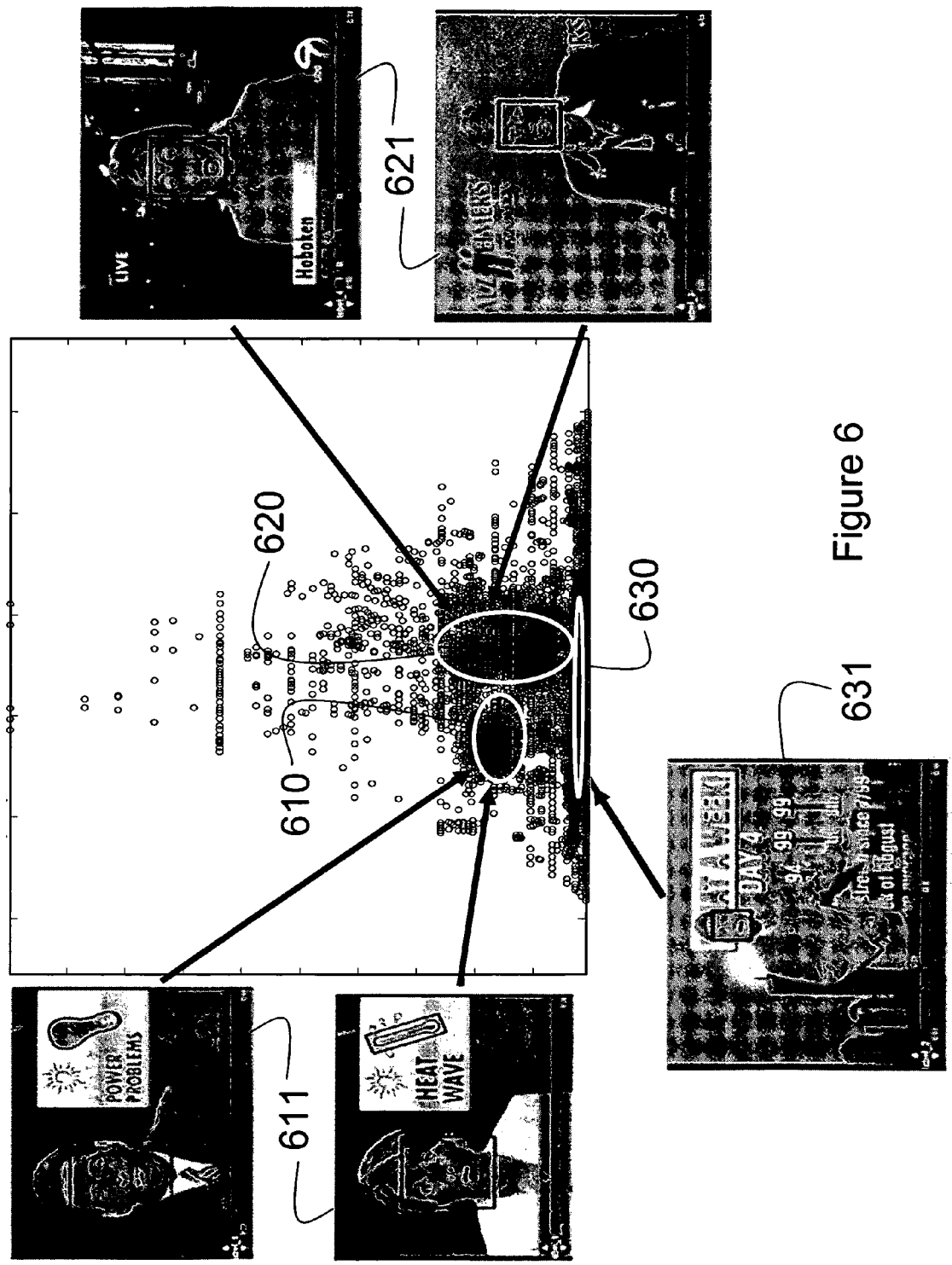
FIG. 6 is the scatter plot of FIG. 5 with example video frames associated with the clusters found according to an embodiment of the invention.

Clustering 1-face frames using face size and x-location gives semantically meaningful classification of video segments into scenes. FIG. 6 shows samples from a news video program where one cluster 610 corresponds to anchorperson shots 611, another cluster 620 to outside correspondents 621, and another cluster 630 to the weather report 631.

Temporal Smoothing

In some cases, a single scene on the border of a cluster falls into multiple clusters, causing fragments. This raw segmentation is not appropriate for browsing because most of the segments are very short, resulting in jerky playback. Skipping to the next segment or sub-segment will only advance the playback a few seconds or less.

To alleviate this problem, we first correct face detection errors using temporal coherence. We use a running window-based tracking where false detections are removed and gaps in tracks are filled. Tracks shorter than a threshold are later removed.

At the second level, we temporally smooth the partitioning results. We treat each labeled cluster as a separate summary. Then we apply morphological smoothing to each of the separate summaries, which removes short gaps as well as short segments below a certain threshold. In our experiments, thresholds of 1 to 3 seconds give reasonable results.

Browsing News and Other Talk Video

The user can watch each segment or sub-segment as a separate summary. In our experiments with news video, we found that one of the clusters usually corresponds to anchorperson segments. Anchorperson segments following another type of segment, in turn, indicate story introduction. Thus, in the cluster that corresponds to the anchorperson, the user can watch the whole summary which goes through the introductions of the stories without the details that usually come from outside footage, or the user can skip to the next segment at any time, which is the start of the next story.

In addition, other talk video content with static scenes, such as talk shows and interview programs, can be partitioned according to the method of the invention. Thus a user can either watch the jokes in the monologue or skip to the guests.

A good way of finding out the guests at a program is by using the 2-face segments, which usually correspond to the host introducing a guest.

The separate segments and sub-segments can also be merged to generate a single, a small number, or any number of summaries. One strategy is discarding the clusters that have high variance. For example, one of the clusters in our experiments had small face size and relatively spread out x-locations. This usually corresponds to the weather report. So, this cluster, although it may have a high variance, is preserved.

Outliers in other clusters can also be eliminated. The remaining clusters can be temporally smoothed, and then merged into a single summary. Markers can be inserted at boundary points of segments and sub-segments, i.e., where the labels change. This way, even if the playback continues through a full story, the user can still have markers to skip to different segments of the story. The final summary is temporally smoothed again to remove gaps that may result from merging.

It is to be understood that various other adaptations and modifications may be made within the spirit and scope of the invention. Therefore, it is the object of the appended claims to cover all such variations and modifications as come within the true spirit and scope of the invention.

We claim:

1. A method for generating a summary of a video including a plurality of frames, comprising a computer processor for performing steps of the method, comprising the steps of:
   detecting a number of faces in each of the plurality of frames of the video;
   classifying each frame according to the number of faces detected in each frame; and
   partitioning the video into segments of the frames according to the classifications of the number of faces in each frame to produce a summary of the video.

2. The method of claim 1, wherein the segmenting further comprises:
   determining, for each frame classified as having a single detected face, one or more characteristics of the face;
   labeling the frames according to the characteristics;
   clustering the frames according to the labels to produce labeled clusters; and
   partitioning the segments having frames classified as single face frames into sub-segments according to the labeled clusters.

3. The method of claim 1, wherein the video is a compressed video.

4. The method of claim 3, wherein the detecting is performed on I-frames of the compressed video.

5. The method of claim 2, wherein the characteristics include a size of a face.

6. The method of claim 2, wherein the characteristics include a location of a face in each image.

7. The method of claim 2, wherein the characteristics include a color histogram of a face.

8. The method of claim 2, wherein the clustering is k-means clustering.

9. The method of claim 2, wherein the clustering is performed using Gaussian mixture models.

10. The method of claim 2, further comprising:
    correcting face detection errors using temporal coherence.

11. The method of claim 2, further comprising:
    removing sub-segments shorter than a threshold length.

12. The method of claim 11, wherein the threshold length is in a range of 1-3 seconds.

13. A system for generating a summary of a video including a plurality of frames, comprising:

means for detecting a number of faces in each of the plurality of frames of the video;

means for classifying the frames according to the number of faces detected in each frame; and means for partitioning the video according to the classifications to produce a summary of the video.

14. The system of claim 13, further comprising:

means for determining, for each frame classified as having a single detected face, one or more characteristics of the face;

means for labeling the frames according to the characteristics;

means for clustering the frames according to the labels to produce labeled clusters; and means for partitioning the segments having frames classified as single face frames into sub-segments according to the labeled clusters.

* * * * *